(12) United States Patent
Peele et al.

(10) Patent No.: US 10,674,683 B2
(45) Date of Patent: Jun. 9, 2020

(54) MAPLE SAP COLLECTION APPARATUS AND METHOD

(71) Applicants: Richard Clark Peele, Elliot, ME (US); Mark D. Lorusso, Portsmouth, NH (US)

(72) Inventors: Richard Clark Peele, Elliot, ME (US); Mark D. Lorusso, Portsmouth, NH (US)

( * ) Notice: Subject to any disclaimer, the term of this patent is extended or adjusted under 35 U.S.C. 154(b) by 168 days.

(21) Appl. No.: 15/160,130

(22) Filed: May 20, 2016

(65) Prior Publication Data

US 2017/0332562 A1    Nov. 23, 2017

(51) Int. Cl.
*A01G 23/14* (2006.01)

(52) U.S. Cl.
CPC ................... *A01G 23/14* (2013.01)

(58) Field of Classification Search
CPC .......... A01G 23/10; A01G 23/14; A01G 7/06; A01G 29/00; F16M 13/022
USPC .......................................... 47/51, 52, 53, 54
See application file for complete search history.

(56) References Cited

U.S. PATENT DOCUMENTS

| | | | | |
|---|---|---|---|---|
| 473,270 | A * | 4/1892 | Tabor | A01G 23/14 47/51 |
| 907,778 | A * | 12/1908 | Gilmer | A01G 23/14 47/11 |
| 930,361 | A * | 8/1909 | Drake | A01G 23/14 47/11 |
| 1,379,358 | A * | 5/1921 | Oliver | A01G 23/14 47/11 |
| 1,682,760 | A * | 9/1928 | Laffin | A01G 7/06 427/4 |
| 2,877,601 | A * | 3/1959 | Griggs | A01G 23/10 47/52 |
| 3,003,283 | A * | 10/1961 | Wilson | A01G 23/14 47/11 |
| 3,156,069 | A * | 11/1964 | Lamb | A01G 23/14 47/51 |
| 3,849,566 | A * | 11/1974 | Szappanyos | A01G 23/10 514/735 |
| 4,299,053 | A * | 11/1981 | Foote | A01G 23/14 47/52 |

(Continued)

*Primary Examiner* — Joshua D Huson
*Assistant Examiner* — Brady W Frazier
(74) *Attorney, Agent, or Firm* — Lorusso & Associates

(57) ABSTRACT

A sap collection assembly to collect sap from sap producing trees includes a cover superposed about a sapling or branch cut surface with one or more spacers used to maintain a gap between the cover and the cut surface. Elastomeric bands with an optional hose clamp are used to secure the cover to the sapling or branch to create an airtight seal between the cover and the cut surface. A bore hole is created in the sapling or tree branch has one end substantially central to the cut surface and a second end exiting a sidewall of the sapling or branch. Taps with optional tabs are secured to the sapling or branch to retrieve sap from the cut surface and bore. For angled bore holes, a modified tap includes a sapling nozzle angled relative to the tap body to accommodate an angled bore. Tubes secured to the taps and stretched to create a downward slope from the sapling or tree to a tube hub point or sap collection point provide a means to transfer sap from sapling or trees to a collection point for processing with or without vacuum assist.

6 Claims, 16 Drawing Sheets

(56) References Cited

U.S. PATENT DOCUMENTS

| | | | | |
|---|---|---|---|---|
| 4,512,104 A | * | 4/1985 | Lamb | A01G 23/14 47/52 |
| 4,884,365 A | * | 12/1989 | Lesquir | A01G 23/14 47/52 |
| 4,887,387 A | * | 12/1989 | Lesquir | A01G 23/14 47/52 |
| 4,926,597 A | * | 5/1990 | Landry | A01G 23/14 239/272 |
| 5,031,357 A | * | 7/1991 | Macbeth | A01G 7/06 47/57.5 |
| 5,224,289 A | * | 7/1993 | Buzzell | A01G 23/14 285/361 |
| 6,370,818 B1 | * | 4/2002 | Chabot | A01G 23/10 47/50 |
| 8,677,682 B2 | * | 3/2014 | Cote | A01G 23/10 47/11 |
| 2010/0170152 A1 | * | 7/2010 | Perkins | A01G 23/14 47/52 |
| 2011/0088316 A1 | * | 4/2011 | Leger | A01G 23/14 47/52 |
| 2015/0040472 A1 | * | 2/2015 | Perkins | A01G 23/10 47/50 |
| 2015/0289457 A1 | * | 10/2015 | Vachon | A01G 23/14 47/52 |
| 2016/0165816 A1 | * | 6/2016 | Desorcy | A01G 23/14 47/52 |
| 2016/0278309 A1 | * | 9/2016 | Emery | A01G 23/14 |
| 2017/0223908 A1 | * | 8/2017 | Putnam | A01G 23/10 |

* cited by examiner

MAPLE SAP COLLECTION APPARATUS AND METHOD

CROSS-REFERENCE TO RELATED APPLICATIONS

None

FIELD OF THE DISCLOSURE

The disclosure relates to apparatus and methods to retrieve sap from sap-producing trees. More particularly, the disclosure relates to an apparatus and method of cross-cutting and capping the tops of sugar maple trunks and/or branches to maximize sap retrieval and eliminate unwanted animal interference.

BACKGROUND OF THE DISCLOSURE

The maple sugar industry has for decades sought ways to improve upon the traditional methods used to extract sap from sugar maple trees. The event typically takes place in the spring when the fluctuating temperatures between relatively warm days and very cold nights cause the sap to migrate from its creation in the root system of the trees into the trunk and branches of the trees. To harvest the sap, holes are drilled into the trunks and taps are secured in the holes. In the more traditional method, a bucket is hung so as to capture any sap that exits the tap. The buckets are left hooked onto the tree until sufficient sap has filled the bucket. The bucket is then removed from the tree and poured into a larger container for transport back to a processing station.

Relatively new advances have improved the quantities harvested from a given size plot of land. Now, trees are tapped and hose lines are secured to the taps to permit the sap to travel from the tree directly to a collection vessel, or directly to the sap processing station. Vacuum pressure is used to urge the sap out of the tree and down the hose line.

To address interference with the hoses from animals, weather conditions and the like, sensors and/or monitors may be used to monitor the integrity of the hose connections. Any failure of a hose connection will prompt a signal to be sent to a monitoring station to alert the system owners or managers to check the specific hose line involved in the sent signal.

A more recent advance in the maple sugar industry involves a cultivation technique that requires a branch or trunk to be cross-cut to leave a stump-like top surface such as disclosed in US 2015/0040472. This "stump," a sapling, is capped with a piece of plastic superposed about and secured to the stump. A hose is secured to the cap with the lumen of the hose in fluid communication with the space defined by the plastic cover and the stump surface. A vacuum force is applied to the hose/cap apparatus to urge sap to migrate out of the stump and into the hose. The disclosed cap may be to formed from semi-rigid or flexible material.

Although this system appears to have increased the sap yield per acre of land, there are drawbacks to the apparatus and method. First, the method requires the use of specialized combinations of materials to achieve the desired sap flow. Common taps cannot be used with this method as there is nowhere to secure the tap to the stump/cap combination. This essentially eliminates the possibility to use common taps to extract sap from the trees. Another problem has to do with keeping the space defined by the stump and the inner surface of the cap open. With the application of vacuum pressure, the pliable cap material can be suctioned against the stump, which will retard sap flow. To solve this problem, a specially designed cap support with perforations is used to keep the cap material from collapsing when under vacuum pressure.

A further problem has to do with the need to stretch the hoses from multiple trees to create a gravitationally fed downhill flow path. The hoses are set at a high point at the furthest tap from the collection point. The lowest point is the main collection point. The cap system of the '472 application is not sufficiently robust, particularly the caps made from flexible material. The '472 addresses this issue by using a drop line secured to a main line. This adds one additional tube and two additional tube connections.

What is needed and what we have developed is a tree/branch capping method that permits the use of common tree taps and eliminates the need for a specialized cap support structure to maintain a space for sap to flow and additional hose lines and hose connectors to achieve a downhill flow path. Our apparatus also eliminates the need for a vacuum system although the apparatus is adaptable for vacuum assist. These and other objects are disclosed as shown in the drawings and detailed disclosure below.

DETAILED DESCRIPTION OF THE DISCLOSURE

Figure 1:
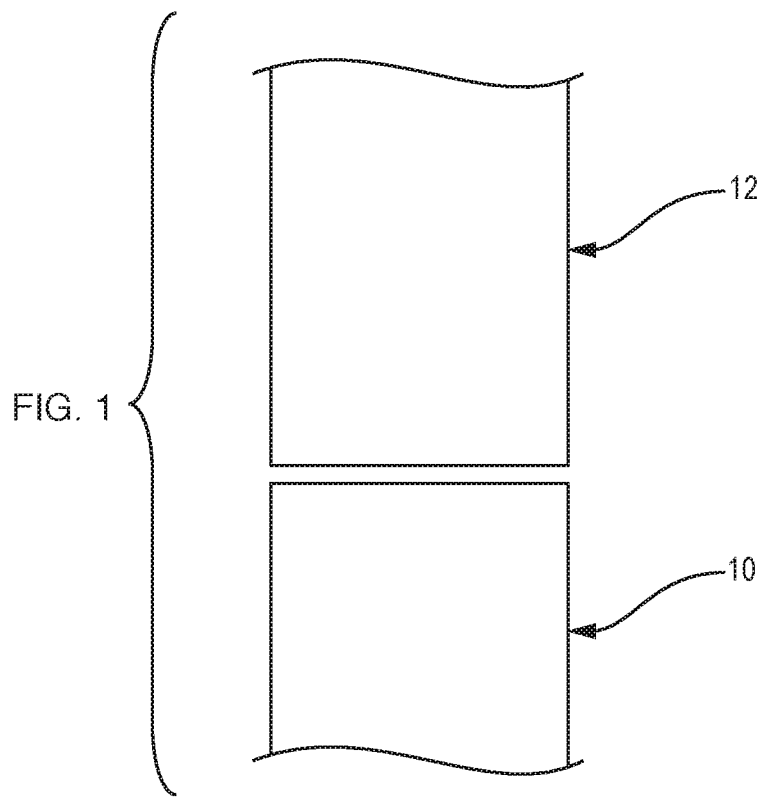
FIG. 1 is a side view of a cut sapling according to one embodiment of the disclosure.

Referring now to FIG. 1, a cut tree sapling designated generally as 10 is formed by removing a top section of the sapling designated generally as 12. Sapling 10 may be any species of maple or like sugar-producing sapling having a trunk diameter from about 1 inch to about 3 inches. Acceptable species include illustratively Sugar maple, Black maple, Red maple, Silver maple, Norway maple, Boxelder (Manitoba maple), Bigleaf maple, Canyon maple, Rocky Mountain maple, Gorosoe, Butternut (White walnut), Black walnut, Heartnut, English walnut, Paper birch, Yellow birch, Black birch, River birch, Gray birch, European white birch, Sycamore and Ironwood (hophornbeam).

It should be understood that the trunk size used for this disclosure may vary from the disclosed range particularly with respect to species of sugar-producing tree. The trunk size range given and the species identified are intended to be illustrative rather than limiting. The sapling may be cut with any conventional sawing tool and the cut should be substantially perpendicular to a central longitudinal axis of the trunk. Slight variations from this cut orientation should also produce acceptable results. Cuts above or below the initial branches of the sapling are all acceptable and effective for the purposes of this disclosure. As further explained herein, the disclosed apparatus and methods for retrieving sap are equally applicable for use with branches on mature sap trees.

Figure 2:
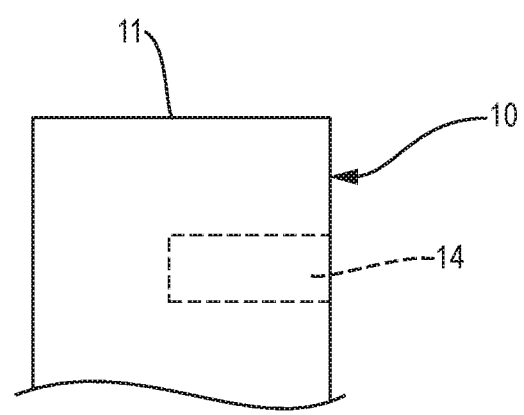
FIG. 2 is a side view of a cut sapling with a side bore according to the embodiment of the disclosure shown in FIG. 1.

Referring now to FIG. 2, to prepare sapling 10 for the sap retrieval apparatus, a substantially horizontal bore 14 is created by boring into a side of sapling 10 at a point below the sapling cut surface 11. Bore 14 may extend inwardly from the outer surface of the sapling to at least a point proximal the center of the sapling diameter. Bore 14 may extend beyond the center, but should not extend into the opposite side of the sapling from the bore's point of origin. Any boring instrument may be used to form the bore that can have a cross-sectional diameter ranging illustratively from about ¼ inch to about 1 inch. It should be understood that the bore size can be modified to accommodate the diameter of an insertion port of a tap as disclosed in more detail below. It should also be understood that the cross-sectional shape of the bore may take on any regular or irregular geometric shape and remain within the scope and spirit of this disclosure.

Figure 3:
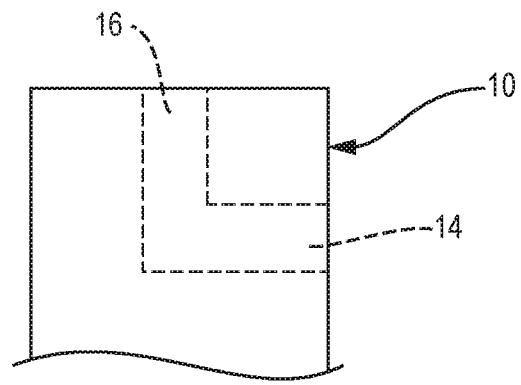
FIG. 3 is a side view of a cut sapling with a side bore and an intersecting top bore according to the embodiment of the disclosure shown in FIG. 1.

As shown in FIG. 3, a substantially vertical bore 16 is created in sapling 10 by drilling into sapling cut surface 11 at the approximate center of the cut surface. Bore 16 is created to extend downwardly and to intersect horizontal bore 14 so as to be in fluid communication with horizontal bore 14. Bore 16 should not pass beyond the lower end of horizontal bore 14 to ensure maximal recovery of sap. Like bore 14, vertical bore 16 can have a cross-sectional diameter ranging illustratively from about ¼ inch to about 1 inch. It should be understood that vertical bore 16 does not have to have the same cross-sectional diameter as horizontal bore 14 as the bore is not required to receive a tap.

Figure 15:
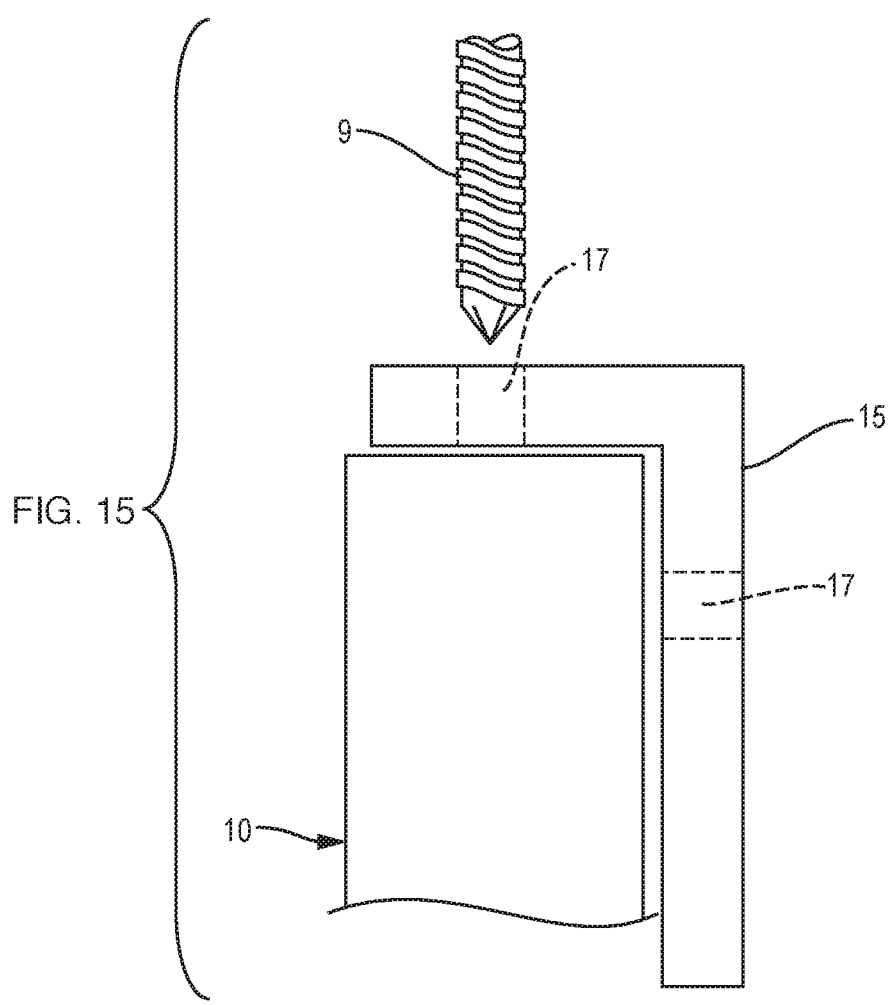
FIG. 15 is a side view of a bore jig according to one embodiment of the disclosure.

Bore 16 should be dimensioned sufficiently large so as not to reduce maximum sap flow out of sapling 10. Bore 16 may have a circular shape in cross-section, but may conform to any regular or irregular geometric shape and remain within the scope and spirit of the disclosure. Moreover, it should be further understood that more than one set of bores 14/16 may be used in a single sapling (or branch of a mature sap tree) with the bore sets offset from one another. A drilling jig, such as jig 15 shown in FIG. 15, may be used to facilitate the drilling steps. Jig 15 includes bore guide holes 17 to orient a drill bit 9. Drill bit 9 may be fitted with a stop to limit the depth of either bore, 14 and/or 16.

Figure 20:
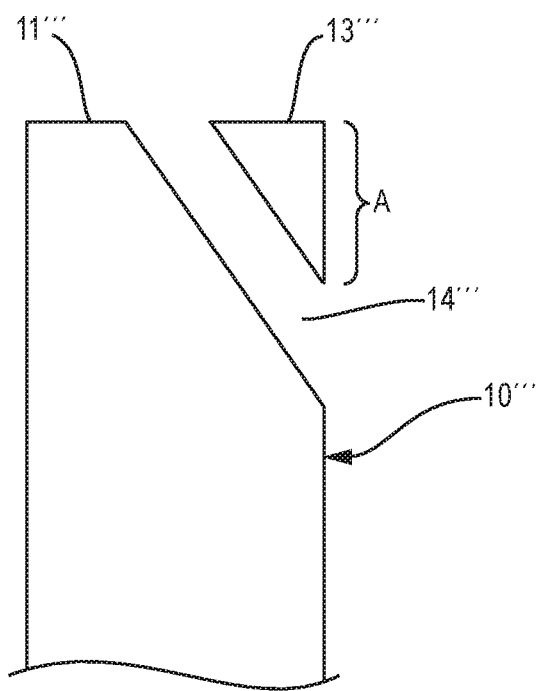
FIG. 20 is a side view of a cut sapling with a single angled bore according to a further embodiment of the disclosure.

In an alternative embodiment, as shown in FIG. 20, a single sloped or hybrid horizontal/vertical bore 14' extends from a substantially central point on sapling cut surface 11 and extends downwardly and radially outwardly toward the outer surface of sapling 10 and opens on the outer surface at a point below cut surface 11. As used herein, features designated with primed reference character numbers in one embodiment correspond to similar features of other disclosed embodiments designated by the same reference character number, unprimed or differently primed. The cross-sectional diameter of bore 14' can range illustratively from about ¼ inch to about 1 inch. Like bore 14, it should be understood that the bore size can be modified to accommodate the diameter of an insertion port of a tap as disclosed in more detail below.

One important consideration for establishing the location and angle of bore 14' is the distance between cut surface 11' and the intersection point of a top end of bore 14' where it exits the side wall of sapling 10'. The distance is designated "A" in FIG. 20 The creation of a bore in close proximity to cut surface 11' creates a weakened zone shown as wedge section 13' in FIG. 20. The top end of bore 14' should be positioned at, or in close proximity to, the center of cut surface 11'. The bottom end of bore 14' should be positioned a sufficient distance from cut surface 11' to ensure enough wood fibers are maintained intact so that wedge section 13' does not break away from sapling 10'. The density and strength of the wood fibers of the particular sapling species can impact the length of "A" with stronger and more dense fibers permitting a shorter dimension and weaker or less dense fibers requiring longer distance to ensure the structural integrity of sapling 10'. For most species, distance "A" should be at least 1 inch to 1.5 inches for a ½ inch diameter bore. As disclosed herein, a hose clamp may be used to provide mechanical support to wedge section 13'.

Figure 4:
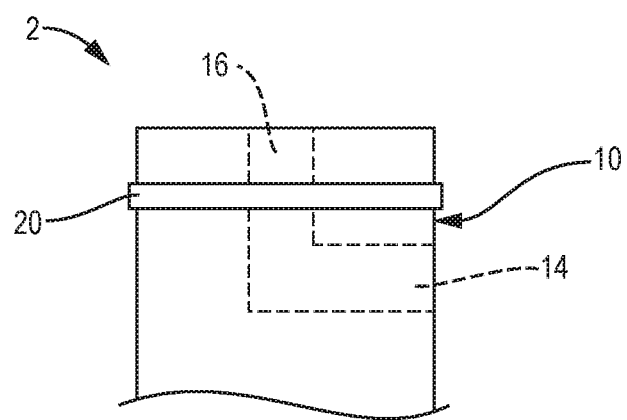
FIG. 4 is a side view of a cut sapling with intersecting bores and a seal band according to the embodiment shown in FIG. 1.

Referring now to FIG. 4, to create an efficient sap retrieval system, the upward flowing sapling fluid channels (xylem) exposed by cut surface 11 have to be secured in a closed system to contain any sap flow. To create an air and fluid-tight seal, a first elastomeric band 20 is secured about sapling 10 at a point above the entry point of bore 14 and below cut surface 11. Band 20 creates a seal against any imperfections in the outer surface of sapling 10 and ensures an enclosure positioned about cut surface 11 will result in an air-tight seal. An outer surface of band 20 performs a similar sealing function with other elements of the enclosure as disclosed in detail below.

Figure 5:
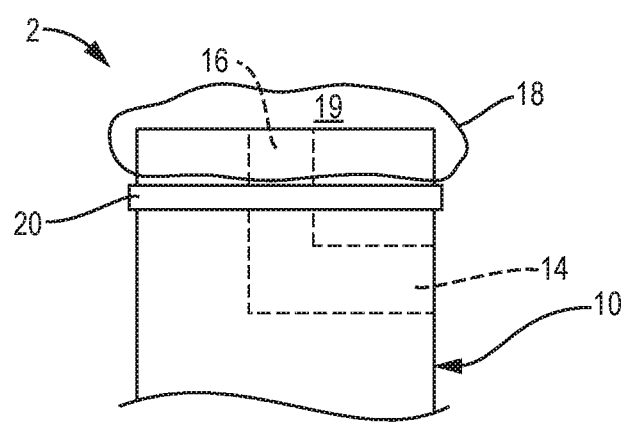
FIG. 5 is a side view in partial phantom of a cut sapling with intersecting bores, a seal band and a cap according to the embodiment of the disclosure shown in FIG. 1.

Referring now to FIG. 5, to enclose cut surface 11 and contain the flow of sap out of sapling 10, an air and fluid impermeable cover made from polymeric sheets, such as polyethylene sheets commonly available in home improvement centers is used. Cover 18 may be a flexible sheet dimensioned to fit over cut end 11 and extend down about the sidewall of sapling 10 to a point below band 20. Cover 18 is made sufficiently large to maintain a gap 19 between cut surface 11 and cover 18. This ensures the cover does not occlude the channels and prevent the migration of sap out of cut surface 11.

Figure 6:
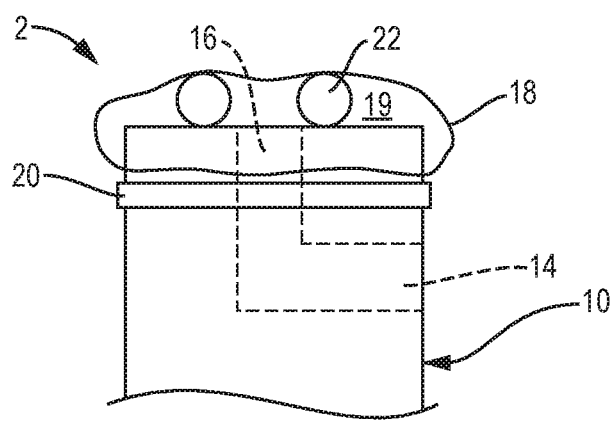
FIG. 6 is a side view in partial phantom of a cut sapling with intersecting bores, a seal band, a cap and cap spacers according to the embodiment of the disclosure shown in FIG. 1.

Referring now to FIG. 6, to ensure gap 19 is maintained during the sap retrieval process, cover supports 22 are placed between cut surface 11 and cover 18. Cover supports 22 are shown as being segments of polymeric cylindrical tubing. Use of tubing for this purpose is advantageous as the registration surfaces of cut surface 11 and supports 22 is minimal so as not to impede the flow of sap into vertical bore 16.

Figure 7:
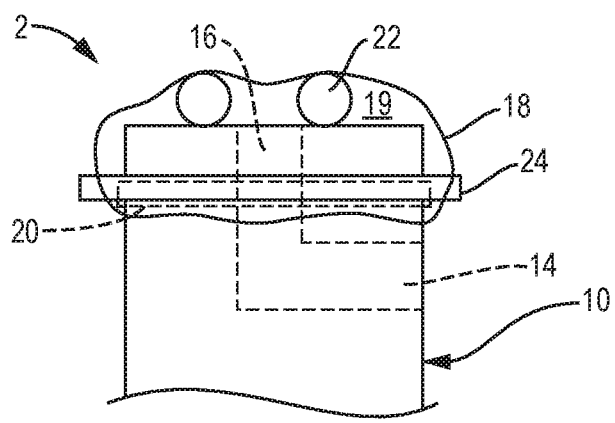
FIG. 7 is a side view in partial phantom of a cut sapling, with intersecting bores, a seal band, a cap, cap spacers, and a cap sealing band according to the embodiment of the disclosure shown in FIG. 1.
Figure 8:
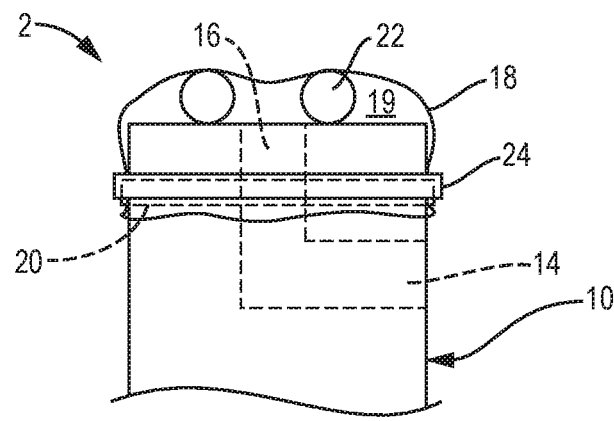

Referring now to FIG. 7, once cover 18 is placed over and about the cut end of sapling 10, a second elastomeric band 24 is positioned about the combination of sapling 10, a lower end of cover 18 and first band 20. Once in position, tension placed on the band to expand it beyond the diameter of the sapling is released so that second band 20 registers against cover 18 and compresses the cover against first band 20 and sapling 10 as shown in FIG. 8. The two elastomeric bands ensure an air-tight seal is created between sapling 10 and cover 18 with bore 16 as the only access to gap 19. The goal of this configuration is to maximize the exposure of the xylem channels at cut surface 11 to permit liquids rising up the channels to exit at the cut surface and flow into bore 16 via gravity or a combination of gravity and vacuum pressure assist. The combination of cover 18, both elastomeric bands, 20 and 24, and an optional hose clamp (disclosed in detail below), positioned about cut surface 11 forms a sapling cap assembly designated generally as 2. Other embodiments of the cap assembly may include sapling taps and accessories associated with sapling taps as further disclosed herein.

Figure 9:
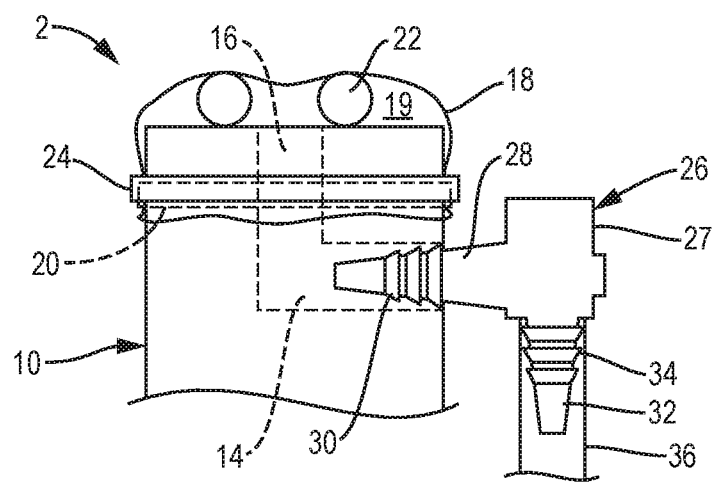
FIG. 9 is a side view in partial phantom of a cut sapling with intersecting bores, a seal band, a cap, cap spacers, a cap sealing band and a tap assembly according to the embodiment of the disclosure shown in FIG. 1.

Referring now to FIG. 9, in a further aspect of the disclosure, with sapling cap assembly 2 completed, a sapling tap shown generally as 26 can be secured to sapling 10 to retrieve and transfer sap flowing into bores 16 and 14. Sapling 26 has a body 27 that defines a main body chamber. A sapling nozzle 28 extends laterally from body 27 and has a substantially frustoconical shape in cross-section with a distal end having a smaller diameter than a nozzle base proximal to body 27. Nozzle 28 defines a sapling nozzle chamber in fluid communication with the main body chamber. A series of annular ribs or teeth 30 are formed about nozzle 28 to create frictional engagement with the cylindrical wall of bore 14. The ribs dig into the bore wall and are configured to resist removal of the nozzle from the bore. A tube nozzle 32 extends downwardly from body 27 and also is substantially frustoconical in cross-section with a distal end having a smaller diameter than a tube nozzle base proximal to body 27. A series of annular ribs or teeth 34 are formed about tube nozzle 32 to create frictional engagement with an inner cylindrical wall of tube a tube 36. Tube 36 is connected to tube nozzle 32 by urging the tube onto the tube nozzle. Like ribs 30, ribs 34 engage the inner wall of tube 36 to create a friction fit seal between the nozzle and the tube. Tube 36 provides a passage to transfer sap flowing into the tube to a central collection point as is commonly used in the art.

Figure 10:
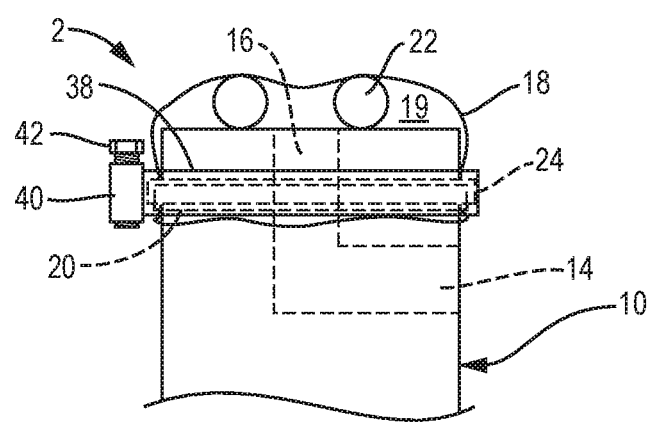
FIG. 10 is a side view in partial phantom of a cut sapling with intersecting bores, a seal band, a cap, cap spacers, a cap sealing band and a hose clamp according to the embodiment of the disclosure shown in FIG. 1.

Referring now to FIG. 10, to ensure cap assembly 2 remains secured to sapling 10, a hose clamp 38 may be superposed about the combination of second band 24, cover 18, first band 20 and sapling 10. A threaded bolt 42 torqued into a bolt receiving cylinder 40 has threading that engages slots formed in clamp 38. By torqueing bolt 42 into cylinder 40, the clamp is tightened about the cap assembly and prevents separation of any of the cap components during operation.

Figure 11:
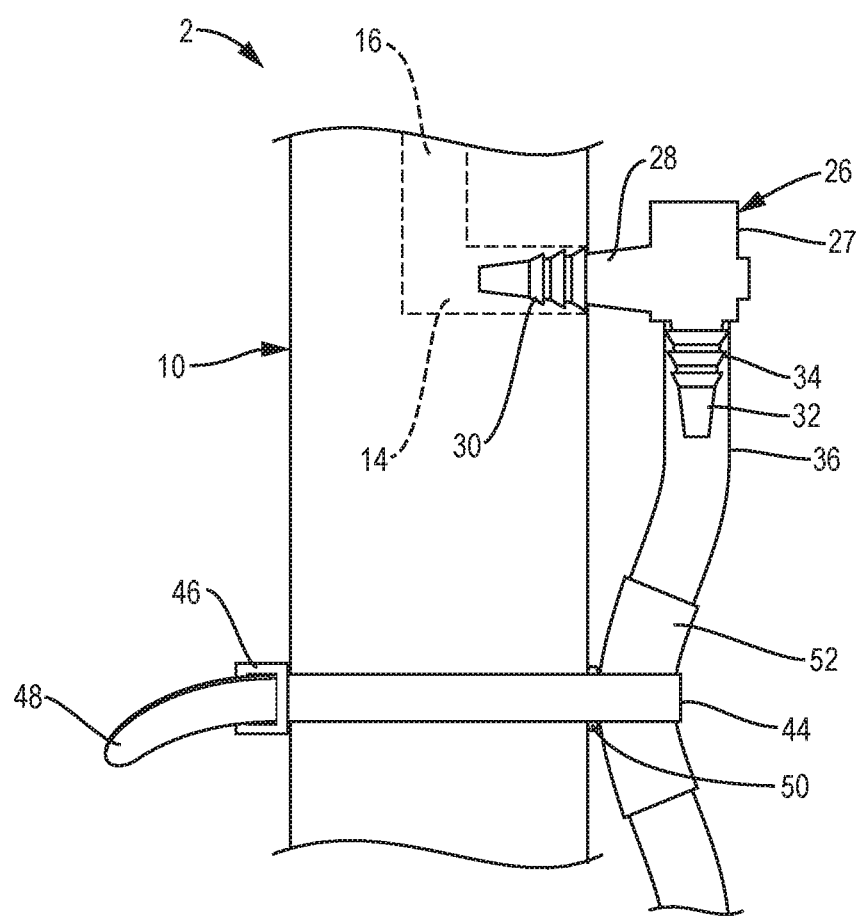
FIG. 11 is a side view in partial phantom of a cut sapling with intersecting bores, a tap assembly and a hose securing strap according to the embodiment of the disclosure shown in FIG. 1.

Referring now to FIG. 11 in a still further aspect of the disclosure, a tube securing band 44 is used to secure tube 36 to sapling 10. By securing the tube to the sapling, the tube can be stretched between trees and tube junctions to create a gravity fed flow path that extends from a high sap retrieval point to a low sap collection point. This is not possible if the tube cannot be stretched to create a downward slope from the sap retrieval point (the sapling), to a sap collection point at a low end of the slope.

To protect tube 36 from abrasion or point compression, a tubular sleeve 52 may be placed over tube 36 at the point where tube 36 is secured to sapling 10. To further protect tube 36, an optional spacer 50, such as a washer, may be placed between the tube and sapling, or the tube sleeve and sapling to help displace the force used to secure the tube to the sapling. Once the sleeve and optional spacer are positioned on tube 36, band 44 is wrapped around the protected tube section and the sapling. A band tip 48, which may be tapered, is inserted into a band buckle 46 that engages lateral ridges formed on the band. As tip 48 is pulled through buckle 46, the band is tightened around the sapling and the tube. Band 44 is tightened sufficient to secure the tube to the sapling without impacting the patency of the tube at the connection point.

Figure 12:
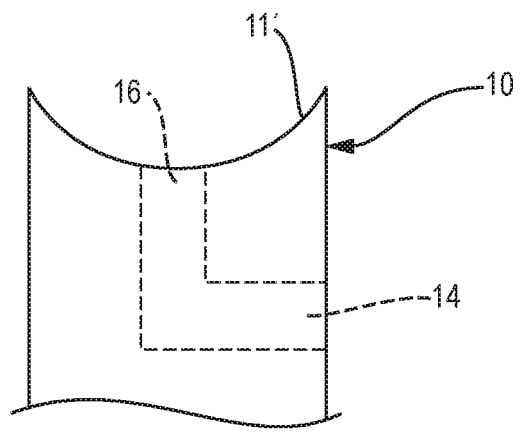
FIG. 12 is a side view in partial phantom of a cut sapling with a concave cut in cross-section and intersecting bores according to another embodiment of the disclosure.

Referring now to FIG. 12, in yet another aspect of the disclosure, cut surface 11 is modified to improve flow into bore 16. To direct sap exiting the sapling's vascular system toward bore 16, a cut surface 11' is formed as a bowl (or concave surface) with the bore at the low point of the bowl. This ensures sap exiting the cut surface migrates towards to the bore and does not drip off the perimeter of the cut surface. This shape may be achieved with a boring instrument, such as a drill bit, that has a diameter, or a portion of the instrument has a diameter, approximately equal to the diameter of the sapling and a sphere-shaped tip.

Figure 13:
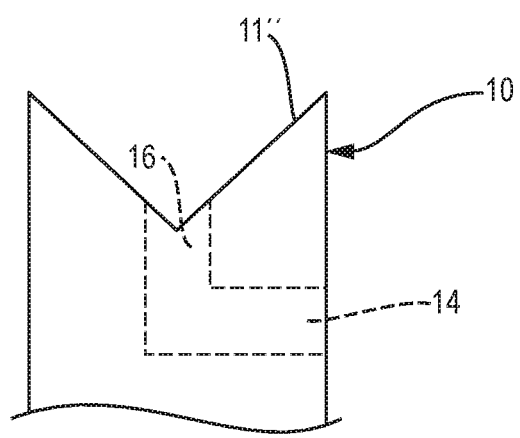
FIG. 13 is a side view in partial phantom of a cut sapling with a downwardly facing cone cut in cross-section and intersecting bores according to a further embodiment of the disclosure.

Referring now to FIG. 13, in still another aspect of the disclosure, a cut surface 11" is modified with a "V" shape in cross-section, or an inverted cone in three-dimension, that directs all sap exiting the cut surface toward bore 16. This cut profile creates a steeper grade for maximal flow. The cut is created by first cross-cutting the sapling and modifying the surface with a drill bit having a V-shaped tip.

Figure 14:
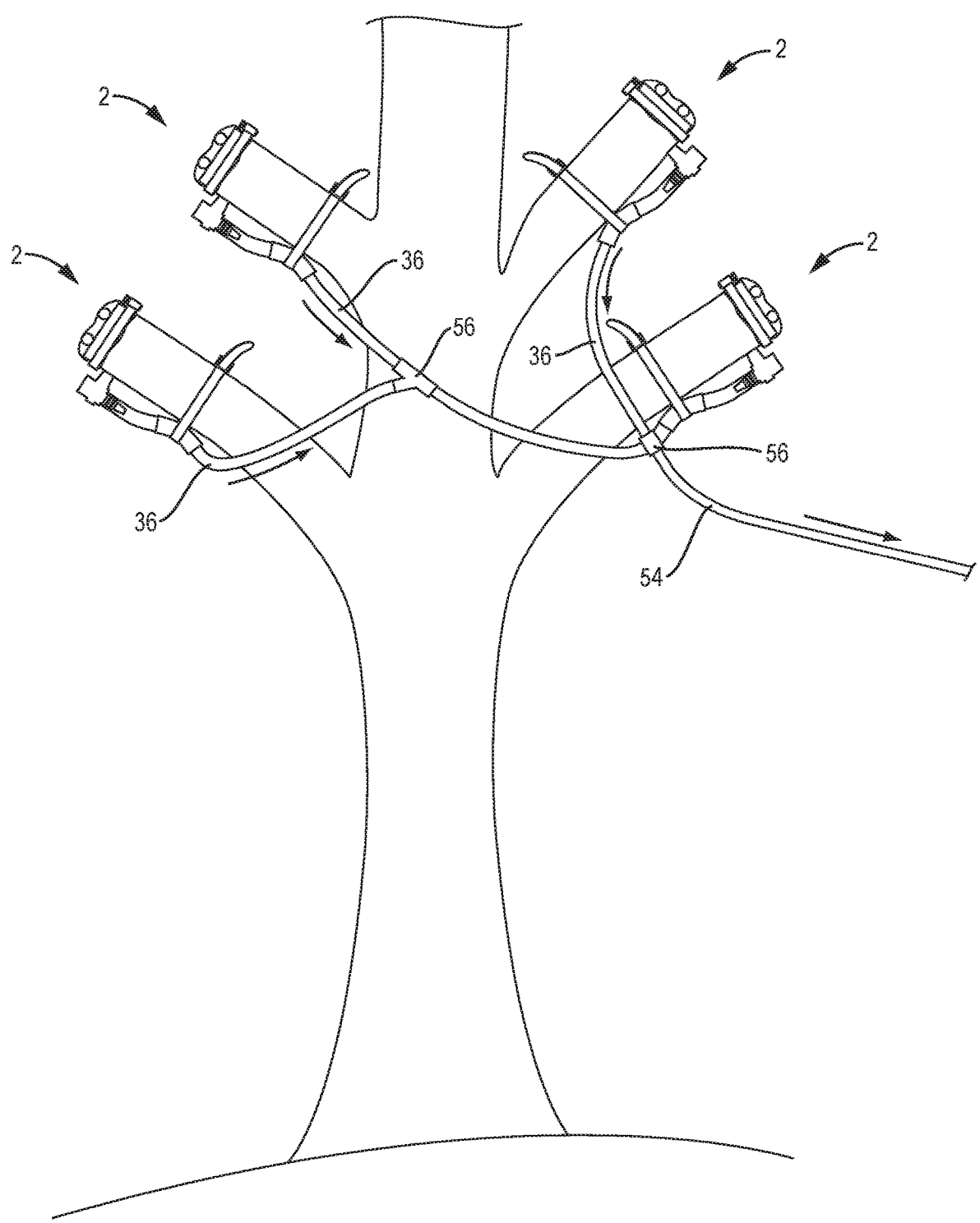
FIG. 14 is a view in elevation of a sap tree with a plurality of sap collecting assemblies secured to individual branches according to yet another embodiment of the disclosure.

Referring now to FIG. 14, in a further aspect of the disclosure, a plurality of cap assemblies 2 are each secured to cross-cut branches of a single sap tree. Tubes 36 lead from the cap assemblies to tube junctions 56 and ultimately to main tube 54. All tubes are stretched and oriented to create a downward slope from the assemblies to main tube 54.

Figure 16:
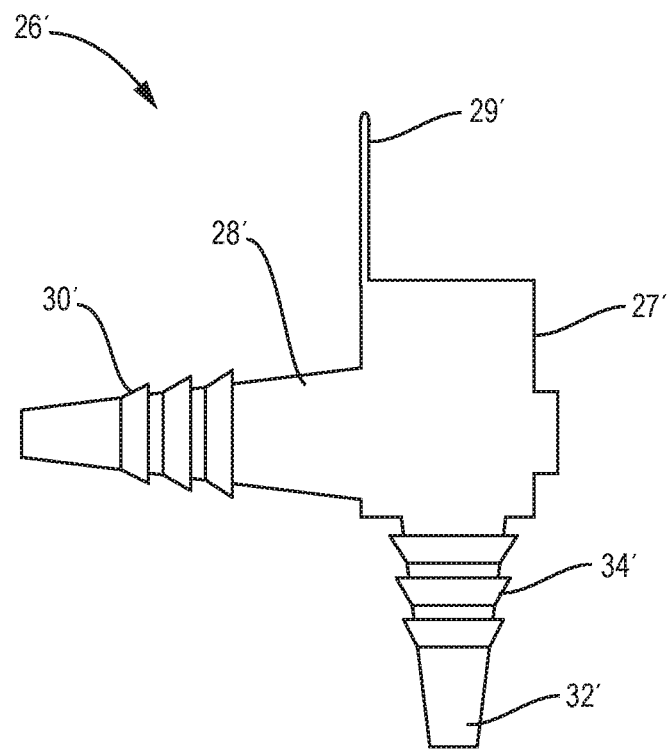
FIG. 16 is a side view of a tap with a securing tab according to a yet further embodiment of the disclosure.

Referring now to FIG. 16, in yet another aspect of the disclosure, a sapling tap, shown generally as 26', includes the general features of sapling tap 26, but includes a tab 29' that permits additional structural support. Like sapling tap 26, tap 26' includes a main body 27' that defines a body chamber. A sapling nozzle 28' extends laterally from main body 27', has a frustoconical shape in cross-section and defines a nozzle passage in fluid communication with the body chamber. An outer surface of nozzle 28' is formed with annular rings or teeth 30' that function to register against the cylindrical wall of bore 14'. A tube nozzle 32' extends downwardly from main body 27' and defines a frustoconical shape in cross-section with a small diameter distal end and a larger diameter proximal end that joins to main body 27. Tube nozzle 32' defines a tube nozzle passage in fluid communication with the body chamber. Tab 29' extends upwardly from main body 27' proximal to a sapling receiving surface of the main body.

Figure 18:
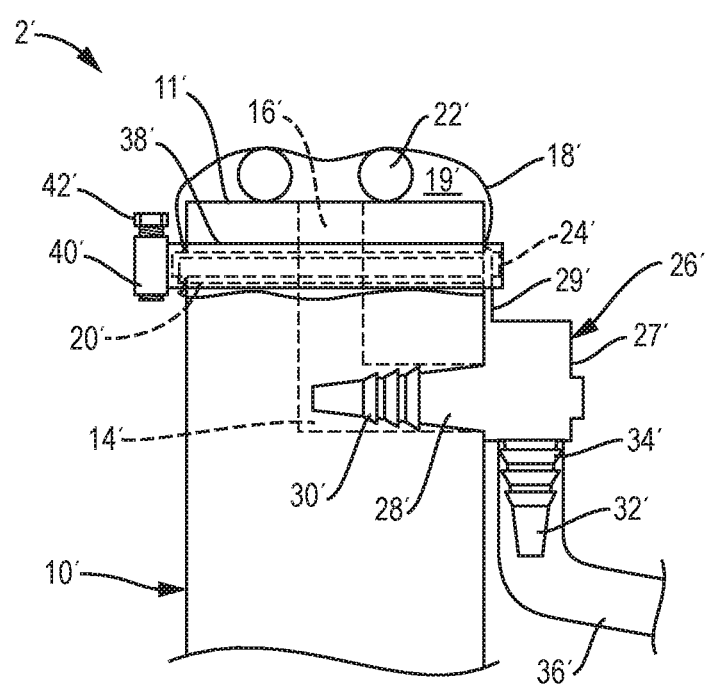
FIG. 18 is a side view in partial phantom of a cut sapling with intersecting bores, a seal band, a cap, cap spacers, a cap sealing band, a hose clamp, a tap assembly with a single securing tab and a sap retrieval hose according to yet another embodiment of the disclosure.

As shown in FIG. 18, tab 29' permits sapling tap 26' to be secured firmly to sapling 10' with the same components used to secure a cover 18' to the sapling. Like cap assembly 2, cap assembly 2' includes a first elastomeric band 20 positioned about sapling 10'. Cover supports 22', positioned on cut surface 11', maintain a gap between the cut surface and a cover 18' placed over sapling 10' in the manner disclosed herein for cover 18. Second elastomeric band 24' is placed about a perimeter end of cover 18' to create an airtight seal between the cover and the sapling.

Tap 26' includes a main body 27' that defines a main tap chamber. A sapling nozzle 28' extends laterally from main body 27' defines a sapling nozzle passage in fluid communication with the main chamber. Tapered nozzle 28' is formed with annular rings 30' to engage the wall of bore 14'. A downwardly extending frustoconically-shaped tube nozzle 32' defines a tube nozzle passage in fluid communication with the main tap chamber. Nozzle 32' is formed with a plurality of annular rings or teeth 34' that engage an inner wall of a tube 36'. Tube 36' is secured to nozzle 32' and provides a passage to transfer sap from the sapling to a collection point for further processing.

Tab 29' provides as least two options to secure sapling tap 26' to sapling 10'. In one method, a dedicated hose clamp can be secured around the sapling with tab 29' positioned within the hose clamp band. Tightening the hose clamp firmly secures tap 26' to sapling 10' via tab 29' and permits hose 36' to be tensioned to create the downwardly descending slope desired to promote the flow of sap from the sapling 10' to a sap collection point. By creating a strong attachment of the cap assembly at the point of the tap, notably positioned proximally to the sapling cut surface and distally from the ground, the hose can be maintained at a maximized distance above the ground to prevent disturbance by ground fauna.

In a second method, sapling tap 26' is secured firmly to sapling 10' by setting bore 14' at a strategic height so that tab 29' can be engaged by hose clamp 38'. As shown in FIG. 18, with this method, tightening the hose clamp band around tab 29', second elastomeric band 24', cover 18', first elastomeric band 20' and sapling 10' by torqueing bolt 42' in cylinder 40' achieves the dual function of creating the air-tight cap assembly and securing sapling tap 26' with one hose clamp. Again, tube 36' can be tensioned to create the desired downward slope from sapling 10' to the collection point. This method can be used to retrieve sap from multiple saplings and/or multiple branches of saplings or mature trees.

Figure 17:
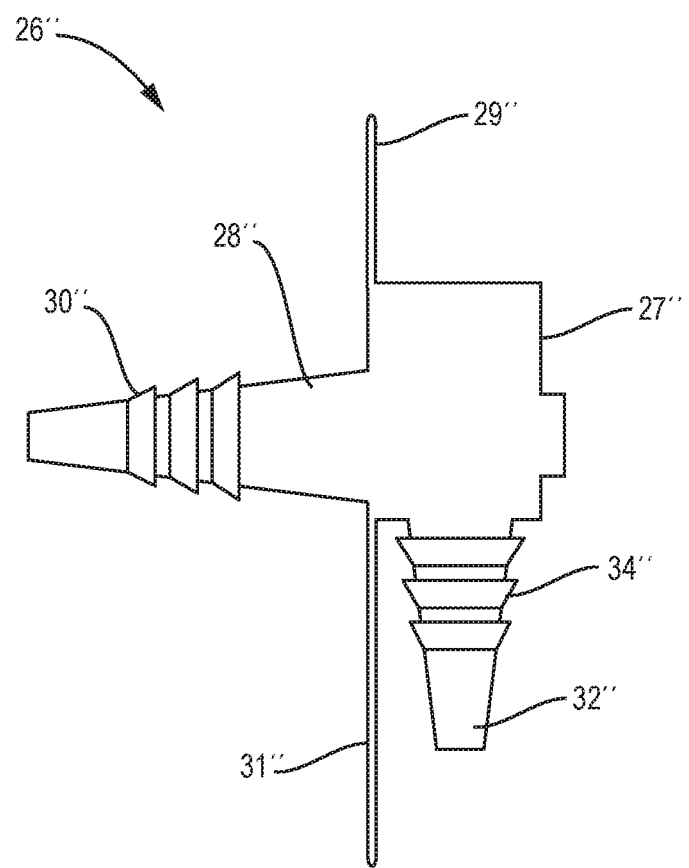
FIG. 17 is a side view of a tap with dual securing tabs according to a still further embodiment of the disclosure.

Referring now to FIG. 17, in a still further aspect of the disclosure, a sapling tap, shown generally as 26", includes the general features of sapling tap 26, but includes a top tab 29" and a bottom tab 31" that permit additional structural support. Like sapling tap 26, tap 26" includes a main body 27" that defines a body chamber. A sapling nozzle 28" extends laterally from main body 27", has a frustoconical shape in cross-section and defines a nozzle passage in fluid communication with the body chamber. An outer surface of nozzle 28" is formed with annular rings or teeth 30" that function to register against the cylindrical wall of bore 14". A tube nozzle 32" extends downwardly from main body 27" and defines a frustoconical shape in cross-section with a small diameter distal end and a larger diameter proximal end that joins to main body 27". Tube nozzle 32" defines a tube nozzle passage in fluid communication with the body chamber. Tab 29" extends upwardly from main body 27" proximal to a sapling receiving surface of the main body. Tab 31" extends downwardly from main body 27" proximal to a sapling receiving surface of the main body.

Figure 19:
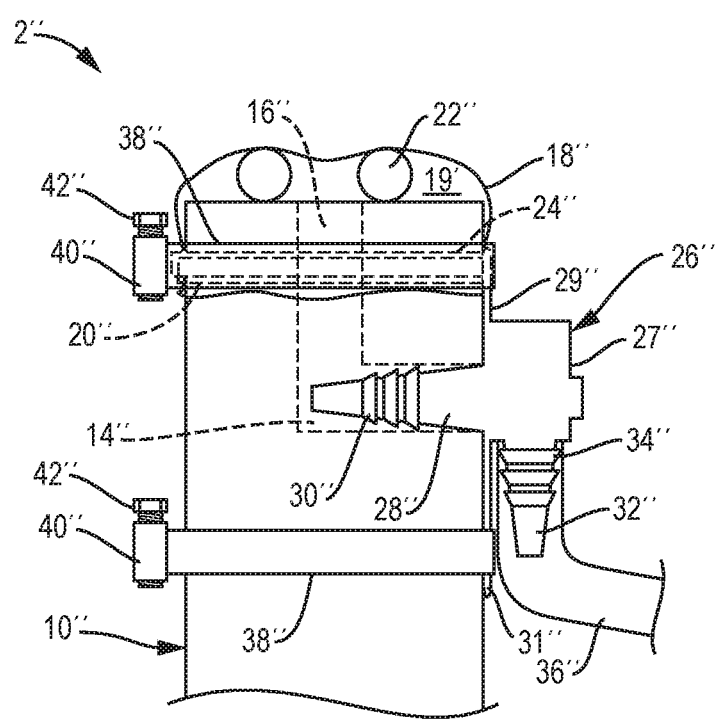
FIG. 19 is a side view in partial phantom of a cut sapling with intersecting bores, a seal band, a cap, cap spacers, a cap sealing band, a hose clamp, a tap assembly with dual securing tabs and a retrieval hose according to still another embodiment of the disclosure.

As shown in FIG. 19, tabs 29" and 31" permit sapling tap 26' to be secured firmly to sapling 10" with the same components used to secure a cover 18" to the sapling. Like cap assembly 2, cap assembly 2" includes a first elastomeric band 20" positioned about sapling 10". Cover supports 22", positioned on cut surface 11", maintain a gap between the cut surface and a cover 18" placed over sapling 10" in the manner disclosed herein for cover 18. Second elastomeric band 24" is placed about a perimeter end of cover 18" to create an airtight seal between the cover and the sapling.

Like tap 26, tap 26" includes a main body 27" that defines a main tap chamber. A sapling nozzle 28" extends laterally from main body 27" defines a sapling nozzle passage in fluid communication with the main chamber. Tapered nozzle 28" is formed with annular rings 30" to engage the wall of bore 14". A downwardly extending frustoconically-shaped tube nozzle 32" defines a tube nozzle passage in fluid communication with the main tap chamber. Nozzle 32" is formed with a plurality of annular rings or teeth 34' that engage an inner wall of a tube 36". Tube 36" is secured to nozzle 32" and provides a passage to transfer sap from the sapling to a collection point for further processing.

Tab 29" provides as least two options to secure sapling tap 26' to sapling 10". In one method, a dedicated hose clamp can be secured around the sapling with tab 29" positioned within the hose clamp band. Tightening the hose clamp firmly secures tap 26" to sapling 10" via tab 29" and permits hose 36" to be tensioned to create the downwardly descending slope desired to promote the flow of sap from sapling 10" to a sap collection point. By creating a strong attachment of the cap assembly at the point of the tap, notably positioned proximally to the sapling cut surface and distally from the ground, the hose can be maintained at a maximized distance above the ground to prevent disturbance by ground fauna.

In a second method, sapling tap 26" is secured firmly to sapling 10" by setting bore 14" at a strategic height so that tab 29" can be engaged by hose clamp 36". As shown in FIG. 19, with this method, tightening the hose clamp band around tab 29", second elastomeric band 24", cover 18", first elastomeric band 20" and sapling 10"by torqueing bolt 42" in cylinder 40" achieves the dual function of creating the air-tight cap assembly and securing sapling tap 26" with one hose clamp. Again, tube 36" can be tensioned to create the desired downward slope from sapling 10" to the collection point. This method can be used to retrieve sap from multiple saplings and/or multiple branches of saplings or mature trees.

Tab 31" provides additional support for tap 26" and permits a greater force to be used to tension tube 36" to set the downward slope of the tube. For this tab, a dedicated hose clamp 38" is used as shown in FIG. 19. The clamp's band is positioned about sapling 10" with tab 31" positioned between the sapling and band. Bolt 42" is torqued into bolt-receiving cylinder 40" in the manner disclosed for cylinder 40 to tighten the hose clamp and secure tab 31" to sapling 10". This embodiment provides a more robust attachment of the tap to the sapling. When tube 36" is tensioned, it places a substantial amount of force on rings 30" and tab 29" that resist the tension force to maintain the tap secured to the tree. Tab 31" displaces the tension force and provides a highly leveraged resistive force to the tension force. This embodiment is particularly advantageous with respect to mature sapling tree groves that have sapling producing trees spaced significant distances due to their relatively large tree crowns that require space to thrive in large tree canopies. The cap assembly 2"/tap 26" combination maximizes the amount of stretching force that can be applied to tube 36" that permits the desired tube slope to be achieved between trees spaced significant distances, such as 100 feet.

Referring now to FIG. 20, in yet another aspect of the disclosure, a modified bore is shown as 14'''. This is a single, angled bore that extends from a substantially central location on cut surface 11''' to a point on the outer surface of sapling 10'''. This embodiment provides a more direct path between cut surface 11''' and the tap (not shown) secured in the bore. An important consideration for this embodiment is to angle the bore to exit the sidewall of the sapling and leave a sufficiently large wedge section 13''' to ensure the integrity of the sapling is maintained. The distance designated A should be illustratively about 1.5 inches on a 2 inch diameter sapling to ensure the wedge section is not pulled off the sapling when the tap/tube assembly is secured to the sapling and the tube is stretched. It should be understood that the distance A can vary depending upon the density of the tree species involved. Species with denser fibers can have relatively shorter distance A wedges compared to species with fewer or weaker fibers.

Figure 21:
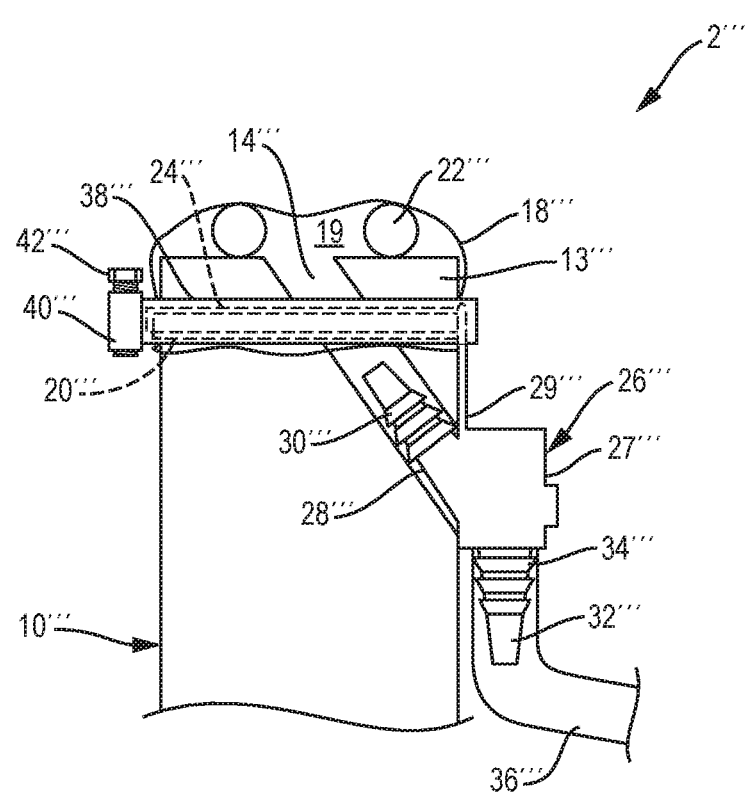
FIG. 21 is a side view in partial phantom of a cut sapling with a single bore, a seal band, a cap, cap spacers, a cap sealing band, a hose clamp, an angled tap with a single securing tab and a retrieval hose according to yet another embodiment of the disclosure.

Referring now to FIG. 21, a sapling prepared with the angled bore 14''' uses a modified tap 26''' to accommodate the altered bore path. Like sapling tap 26, tap 26''' includes a main body 27''' that defines a main body chamber. Unlike sapling tap 26, tap 26''' has a sapling nozzle 28''' that extends laterally and upwardly from main body 27' in conformance with the angle of angled bore 14''' relative to a longitudinal axis of sapling 10'''. More particularly, a longitudinal axis of nozzle 28''' forms an angle with a vertical longitudinal axis of main body 27''' that conforms with the angle of angled bore 14'''. Nozzle 28''' has a frustoconical shape in cross-section and defines a nozzle passage in fluid communication with the body chamber. An outer surface of nozzle 28''' is formed with annular rings or teeth 30''' that function to register against the cylindrical wall of angled bore 14'''. A tube nozzle 32''' extends downwardly from main body 27''' and defines a frustoconical shape in cross-section with a small diameter distal end and a larger diameter proximal end that joins to main body 27'''. Tube nozzle 32''' defines a tube nozzle passage in fluid communication with the body chamber. A tube 36' is secured to nozzle 32' and provides a passage to transfer sap from the sapling to a collection point for further processing. An optional tab 29''' extends upwardly from main body 27''' proximal to a sapling receiving surface of the main body.

As shown n FIG. 21, tab 29''' permits sapling tap 26''' to be secured firmly to sapling 10''' with the same components used to secure a cover 18''' to the sapling. Like cap assembly 2, cap assembly 22''' includes a first elastomeric band 20''' positioned about sapling 10'''. Cover supports 22''', positioned on cut surface 11''', maintain a gap between the cut surface and a cover 18''' placed over sapling 10''' in the manner disclosed herein for cover 18'''. Second elastomeric band 24''' is placed about a perimeter end of cover 18''' to create an airtight seal between the cover and the sapling.

Tap 26''' provides an additional mechanical advantage over tap 26 and even tap 26' in that the combination of the angled sapling nozzle 28''' and the tab 29''' mechanically "lock" tap 26''' to wedge section 13'''. The tendency of tap 26''' to pull away from sapling 10''' when tube 36'''' is tensioned is counteracted by the registration of sapling nozzle 28'''' and tab 28'''' against wedge 13'''. Use of hose clamp (disclosed in more detail below), to secure tab 29''' against sapling 10''' enhances the mechanical lock created by nozzle 28''' and tab 29'''.

Tab 29''' provides as least two options to secure sapling tap 26''' to sapling 10'''. In one method, a dedicated hose clamp can be secured around the sapling with tab 29''' positioned within the hose clamp band. Tightening the hose clamp firmly secures tap 26''' to sapling 10''' via tab 29''' and permits hose 36''' to be tensioned to create the downwardly descending slope desired to promote the flow of sap from sapling 10''' to a sap collection point. By creating a strong attachment of the cap assembly at the point of the tap, notably positioned proximally to the sapling cut surface and distally from the ground, the hose can be maintained at a maximized distance above the ground to prevent disturbance by ground fauna.

In a second method, sapling tap 26''' is secured firmly to sapling 10''' by setting bore 14''' at a strategic height so that tab 29''' can be engaged by hose clamp 38'''. As shown in FIG. 18, with this method, tightening the hose clamp band around tab 29''', second elastomeric band 24''', cover 18''', first elastomeric band 20''' and sapling 10''' by torqueing bolt 42''' in bolt-receiving cylinder 40''' achieves the dual function of creating the air-tight cap assembly and securing sapling tap 26''' with one hose clamp. Again, tub 36''' can be tensioned to create the desired downward slope from sapling 10''' to the collection point. This method can be used to retrieve sap from multiple saplings and/or multiple branches of saplings or mature trees.

Figure 22:
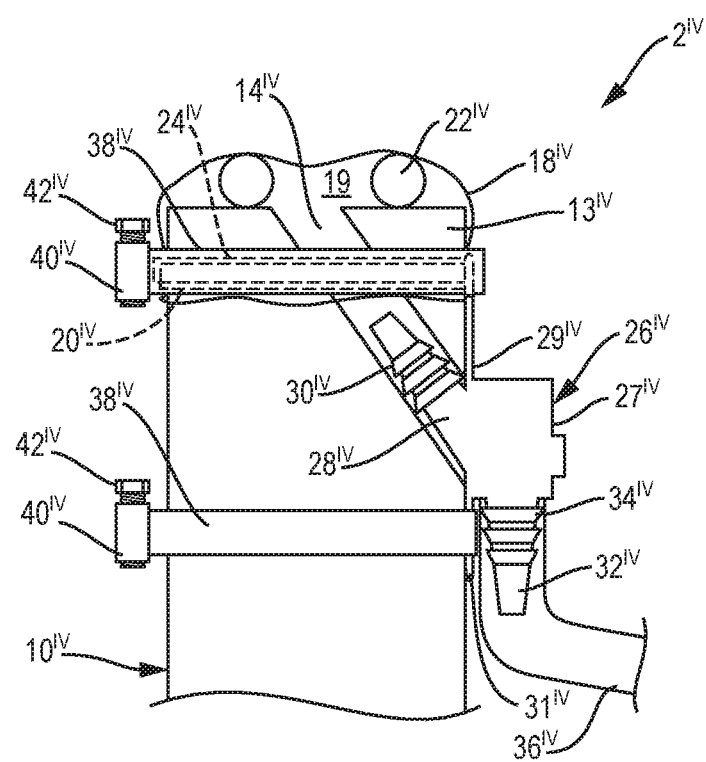
FIG. 22 is a side view in partial phantom of a cut sapling with a single bore, a seal band, a cap, cap spacers, a cap sealing band, a hose clamp, an angled tap assembly with dual securing tabs and a retrieval hose according to a further embodiment of the disclosure.

Referring now to FIG. 22, in a still further aspect of the disclosure, a sapling tap, shown generally as $26^{IV}$, includes the general features of sapling tap 26, but includes a top tab $29^{IV}$ and a bottom tab $31^{IV}$ that provide additional structural support to the sapling tap. Like sapling tap 26, tap $26^{IV}$ includes a main body $27^{IV}$ that defines a body chamber. A sapling nozzle $28^{IV}$ extends laterally from main body $27^{IV}$, has a frustoconical shape in cross-section and defines a nozzle passage in fluid communication with the body chamber. An outer surface of nozzle $26^{IV}$ is formed with annular rings or teeth $30^{IV}$ that function to register against the cylindrical wall of bore $14^{IV}$. A tube nozzle $32^{IV}$ extends downwardly from main body $27^{IV}$ and defines a frustoconical shape in cross-section with a small diameter distal end and a larger diameter proximal end connected to main body $27^{IV}$. Tube nozzle $32^{IV}$ defines a tube nozzle passage in fluid communication with the main body chamber. Tab $29^{IV}$ extends upwardly from main body $27^{IV}$ proximal to a sapling receiving surface of the main body. Tab $31^{IV}$ extends downwardly from main body $27^{IV}$ proximal to the sapling receiving surface.

As shown in FIG. 22, tabs $29^{IV}$ and $31^{IV}$ permit sapling tap $26^{IV}$ to be secured firmly to sapling $10^{IV}$ with the same components used to secure a cover $18^{IV}$ to the sapling. Like cap assembly 2, cap assembly $2^{IV}$ includes a first elastomeric band $20^{IV}$ positioned about sapling $10^{IV}$. Cover supports $22^{IV}$, positioned on cut surface $11^{IV}$, maintain a gap between the cut surface and cover $18^{IV}$ placed over sapling $10^{IV}$ in the manner disclosed herein for cover 18. Second elastomeric band $24^{IV}$ is placed about a perimeter end of cover $18^{IV}$ and compresses the cover against first band $24^{IV}$ and sapling $10^{IV}$ to create an airtight seal between the cover and the sapling.

Like tap 26, tap $26^{IV}$ includes a main body $27^{IV}$ that defines a main tap chamber. A sapling nozzle $28^{IV}$ extends laterally from main body $27^{IV}$ and defines a sapling nozzle passage in fluid communication with the main chamber. Tapered nozzle $28^{IV}$ is formed with annular rings $30^{IV}$ to engage the cylindrical wall of bore $14^{IV}$. A downwardly extending frustoconically-shaped tube nozzle $32^{IV}$ defines a tube nozzle passage in fluid communication with the main tap chamber. Nozzle $32^{IV}$ is formed with a plurality of annular rings or teeth $34^{IV}$ that engage an inner wall of a tube $36^{IV}$. Tube $36^{IV}$ is secured to nozzle $32^{IV}$ and provides a passage to transfer sap from the sapling to a collection point for further processing.

Like tab $29'''$, tab $29^{IV}$ provides as least two options to secure sapling tap $26^{IV}$ to sapling $10^{IV}$. In one method, a dedicated hose clamp can be secured around the sapling with tab $29^{IV}$ positioned within the field of the hose clamp band. Tightening the hose clamp firmly secures tap $26^{IV}$ to sapling $10^{IV}$ via tab $29^{IV}$ and permits hose $36^{IV}$ to be tensioned to create the downwardly descending slope desired to promote the flow of sap from sapling $10^{IV}$ to a sap collection point with, or without vacuum assist. By creating a strong attachment of the cap assembly at the point of the tap, notably positioned proximally to the sapling cut surface and distally from the ground, hose $36^{IV}$ can be maintained at a maximized distance above the ground to prevent disturbance by ground fauna.

In a second method, sapling tap $26^{IV}$ is secured firmly to sapling $10^{IV}$ by setting the entry point of bore $14^{IV}$ at a strategic height so that tab $29^{IV}$ can be engaged by hose clamp $38^{IV}$. As shown in FIG. 22, with this method, tightening the hose clamp band around tab $29^{IV}$, second elastomeric band $24^{IV}$, cover $18^{IV}$, first elastomeric band $20^{IV}$ and sapling $10^{IV}$, by torqueing bolt $42^{IV}$ in cylinder $40^{IV}$, achieves the dual function of creating the air-tight cap assembly and securing sapling tap $26^{IV}$ with one hose clamp. Again, tube $36^{IV}$ can be tensioned to create the desired downward slope from sapling $10^{IV}$ to the collection point. This method can be used to retrieve sap from multiple saplings and/or multiple branches of individual saplings or mature trees.

Tab $31^{IV}$ provides additional support for tap $26^{IV}$ and permits the application of a greater force to tension tube $36^{IV}$ and set the downward slope of the tube. For this tab, a dedicated hose clamp $38^{IV}$ is used as shown in FIG. 22. The clamp's band is positioned about sapling $10^{IV}$ with tab $31^{IV}$ positioned between the sapling and the clamp band. Bolt $42^{IV}$ is torqued into bolt-receiving cylinder $40^{IV}$ in the manner disclosed for cylinder 40 to tighten the hose clamp and secure tab $31^{IV}$ to sapling $10^{IV}$. This embodiment provides a more robust attachment of the tap to the sapling. When tube $36^{IV}$ is tensioned, it places a substantial amount of force on rings $30^{IV}$ and tab $29^{IV}$ that resist the tension force to maintain the tap secured to the tree. Tab $31^{IV}$ displaces the tension force and provides a highly leveraged resistive force to the tension force.

This embodiment is particularly advantageous with respect to mature sapling tree groves that have sapling producing trees spaced significant distances due to their relatively large tree crowns that require space to thrive in large tree canopies. The cap assembly $2^{IV}$/tap $26^{IV}$ combination maximizes the amount of stretching force that can be applied to tube $36^{IV}$ that permits the desired tube slope to be achieved between trees spaced significant distances, such as 100 feet.

The apparatus components described herein, such as the tubes and sapling taps may be constructed from any injection-moldable thermal plastics, such as polypropylene, polyethylene, high-density polyethylene, nylon, and the like. The materials are used in conventional injection molding processes to create, illustratively, the sapling taps in mold halves. The elastomeric bands described herein may be formed from rubber, neoprene, silicone, or any material that exhibits desirable elastomeric properties. Ideally, the material will also have good resistance to weather cycles of freezing and thawing as well as good resistance to UV light degradation. The sapling cut surface covers/sheets can be formed from polyethylene, polypropylene, or any other similar material known in the art. Another important consideration regarding the cover material is to select a material with sufficient resiliency to sharp objects and implements to prevent penetration from animal claws and the like.

To operate any of the disclosed sapling cap assembly embodiments, sap, naturally produced by the saplings, rises up the xylem and exits onto the cut surface. As the edges of the cut surface are sealed by the cover, the sap will flow toward and enter into the bore that exits onto the cut surface. The sap next flows into the sapling nozzle, into the tap body and out the tube nozzle into the tube. The sap follows the tube path via gravity assist until it reaches a collection point for further processing into syrup. Optionally, a vacuum assist system may be employed to urge the sap from the xylem, through the sapling cap assembly including a sapling tap, and down the tube(s) to the collection point. The vacuum force may be applied directly to the sapling cap assembly, or may be introduced into the tube system proximal to the collection point, or at any point along the tube line(s). It should be understood that the cap assembly embodiments disclosed herein to not require vacuum assist to be effective, but can be made more efficient with vacuum assist.

While the present disclosure has been described in connection with several embodiments thereof, it will be apparent to those skilled in the art that many changes and modifications may be made without departing from the true spirit and scope of the present disclosure. Accordingly, it is intended by the appended claims to cover all such changes and modifications as come within the true spirit and scope of the disclosure.

The invention claimed is:

1. A sap collection assembly attachable to a sapling having a cut surface and having a bore formed therein that has one end that exits the cut surface and a second end that exits a side of the sapling, the assembly comprising:

a tap comprising a main body defining a main body chamber;

a sapling nozzle defining a sapling nozzle chamber and extending from the main body, the sapling nozzle chamber in fluid communication with the main body chamber;

a tube nozzle defining a tube nozzle chamber and extending from the main body, the tube nozzle chamber in fluid communication with the main body chamber;

a first tab extending from the main body;
a second tab extending from the main body in a direction different than a direction the first tab extends from the main body;
a first band positioned about the sapling proximal to the cut surface and above the sidewall bore exit;
at least one spacer placed on the cut surface and positioned not to occlude the bore;
a cover superposed about the sapling and at least one spacer proximal to the cut surface, wherein a perimeter of the cover extends over the first band, wherein the first tab is positioned either over or under the cover;
a clamp secured about, the first tab, the cover, the first band and the sapling; and,
a second band secured about the cover, the first band and the sapling, and under the clamp.

2. The sap collection assembly of claim 1 further comprising a tube secured to the tube nozzle.

3. The sap collection assembly of claim 1 wherein the assembly is attachable to a sapling having a cut surface in the form of a shape selected from the group consisting of flat, inverse cone and concave.

4. The sap collection assembly of claim 1 wherein the sapling nozzle has a longitudinal axis that forms an angle with a longitudinal axis of the main body.

5. A sap collection assembly attachable to a sapling having a cut surface and having a bore formed therein that has one end that exits the cut surface and a second end that exits a side of the sapling, the assembly comprising:
a tap comprising a main body defining a main body chamber;
a sapling nozzle defining a sapling nozzle chamber and extending from the main body, the sapling nozzle chamber in fluid communication with the main body chamber;
a tube nozzle defining a tube nozzle chamber and extending from the main body, the tube nozzle chamber in fluid communication with the main body chamber;
a first band positioned about the sapling proximal to the cut surface and above the sidewall bore exit;
at least one spacer placed on the cut surface and positioned not to occlude the bore;
a cover superposed about the sapling and at least one spacer proximal to the cut surface, wherein a perimeter of the cover extends over the first band;
a clamp secured about the cover, the first band and the sapling; and,
a second band secured about the cover, the first band and the sapling, and under the clamp.

6. The sap collection assembly of claim 5 further comprising a tube secured to the tube nozzle and a tube securing assembly comprising a tube securing band, spacer and a tubular sleeve.

* * * * *